United States Patent
Sasahara et al.

(10) Patent No.: US 7,108,936 B2
(45) Date of Patent: *Sep. 19, 2006

(54) FUEL CELL ASSEMBLY

(75) Inventors: Jun Sasahara, Saitama (JP); Nariaki Kuriyama, Saitama (JP); Tadahiro Kubota, Saitama (JP); Yuji Isogai, Saitama (JP); Sang-Joon John Lee, Stanford, CA (US)

(73) Assignees: Honda Giken Kogyo Kabushiki Kaisha, Tokyo (JP); The Board of Trustees of the Leland Stanford Junior University, Palo Alto, CA (US)

( * ) Notice: Subject to any disclaimer, the term of this patent is extended or adjusted under 35 U.S.C. 154(b) by 441 days.

This patent is subject to a terminal disclaimer.

(21) Appl. No.: 10/275,667

(22) PCT Filed: May 8, 2001

(86) PCT No.: PCT/US01/11761

§ 371 (c)(1),
(2), (4) Date: Apr. 1, 2003

(87) PCT Pub. No.: WO01/95404

PCT Pub. Date: Dec. 13, 2001

(65) Prior Publication Data

US 2003/0162073 A1    Aug. 28, 2003

Related U.S. Application Data

(60) Provisional application No. 60/202,827, filed on May 8, 2000, provisional application No. 60/242,136, filed on Oct. 23, 2000.

(51) Int. Cl.
*H01M 2/08* (2006.01)
*H01M 2/16* (2006.01)
*H01M 8/10* (2006.01)

(52) U.S. Cl. ............................ 429/34; 429/30; 429/35; 429/36; 429/38

(58) Field of Classification Search ................ 429/30, 429/34–36, 38, 39, 46
See application file for complete search history.

(56) References Cited

U.S. PATENT DOCUMENTS 4,699,853 A * 10/1987 Okada et al. ................ 429/37

(Continued)

OTHER PUBLICATIONS

"Glass Wafer", Asahi Techno Glass Corp. http://www.atgc.co.jp/div/material/hebin/fe0000.html.

(Continued)

*Primary Examiner*—Tracy Dove
(74) *Attorney, Agent, or Firm*—Lumen Intellectual Property Services, Inc.

(57) ABSTRACT

In a fuel cell assembly typically with a plurality of cells each including an electrolyte layer (2), a pair of gas diffusion electrode layers (3, 4), and a pair of flow distribution plates (5), the electrolyte layer (2) comprises a frame (21) and electrolyte (22) retained in the frame; and the flow distribution plates and frames are made of materials having similar thermal expansion properties so that the generation of thermal stress between the frames of the electrolyte layers and the corresponding flow distribution plates can be avoided, and the durability of the various components can be ensured. By joining each flow distribution plate with the corresponding frame by anodic bonding or using a bonding agent along a periphery thereof, the need for a sealing arrangement such as a gasket or a clamping arrangement can be eliminated, and this contributes to the compact design of the assembly.

4 Claims, 4 Drawing Sheets

U.S. PATENT DOCUMENTS

| | | | | |
|---|---|---|---|---|
| 4,758,481 | A | | 7/1988 | Fauvel ......................... 429/39 |
| 5,302,471 | A | * | 4/1994 | Ito et al. ....................... 429/24 |
| 5,858,567 | A | | 1/1999 | Spear, Jr. et al. ............. 429/12 |
| 6,733,916 | B1 | * | 5/2004 | Mizuno ........................ 429/36 |
| 6,818,338 | B1 | * | 11/2004 | Kubota et al. ................ 429/26 |
| 2003/0162076 | A1 | * | 8/2003 | Kubota et al. ................ 429/38 |
| 2005/0175882 | A1 | * | 8/2005 | Sasahara et al. .............. 429/36 |

OTHER PUBLICATIONS

Madou, Marc, "Fundamentals of Microfabrication" (1997) Library of Congress Cataloging-in-Publication Data, 9643344, pp. 384-389.

\* cited by examiner

FUEL CELL ASSEMBLY

This application claims the benefit of U.S. Provisional Application Nos. 60/202,827, filed May 8, 2000, and 60/242,136, filed Oct. 23, 2000, both of which are herein incorporated by reference.

TECHNICAL FIELD

The present invention relates to a fuel cell assembly typically with a plurality of fuel cells each including an electrolyte layer, a pair of gas diffusion electrode layers placed on either side of the electrolyte layer, and a pair of flow distribution plates placed on either outer side of the gas diffusion electrode layers to define passages for distributing fuel gas and oxidizing gas in cooperation with the opposing surfaces of the gas diffusion electrode layers.

BACKGROUND OF THE INVENTION

A fuel cell includes an electrolyte layer and a pair of electrodes placed on either side of the electrolyte layer, and generates electricity through an electrochemical reaction between fuel gas such as hydrogen and alcohol and oxidizing gas such as oxygen and air, which are supplied to the corresponding electrodes, with the aid of a catalyst. Depending on the electrolytic material used for the electrolyte layer, the fuel cell may be called as the phosphoric acid type, solid polymer type or molten carbonate type.

In particular, the solid polymer electrolyte (SPE) type fuel cell using an ion-exchange resin membrane for the electrolyte layer is considered to be highly promising because of the possibility of compact design, low operating temperature (100° C. or lower), and high efficiency.

The SPE typically includes an ion-exchange resin membrane made of perfluorocarbonsulfonic acid (Nafion: tradename), phenolsulfonic acid, polyethylenesulfonic acid, polytrifluorosulfonic acid, and so on. A porous carbon sheet impregnated with a catalyst such as platinum powder is placed on each side of the ion-exchange resin membrane to serve 5 as a gas diffusion electrode layer. This assembly is called as a membrane-electrode assembly (MEA). A fuel cell can be formed by defining a fuel gas passage on one side of the MEA and an oxidizing gas passage on the other side of the MEA by using flow distribution plates (separators).

Typically, such fuel cells are stacked, and the flow distribution plates are shared by the adjacent fuel cells in the same stack. When forming such a stack, it is necessary to seal off the passages defined on the surfaces of the MEAs from outside. Conventionally, gaskets were placed in the periphery of the interface between each adjoining pair of a MEA and a distribution plate. The contact area between the MEA and the gas diffusion electrode was ensured by pressing them together by applying an external force, typically with the aid of a suitable fastener. The required electric connection between the gas diffusion electrode and an electrode terminal connected to an external circuit was also ensured by pressing them together by applying an external force.

However, because the MEA changes its volume depending on the water content and temperature of the SPE, the external force applied by a fastener inevitably changes, and this may impair the sealing capability of the assembly. The SPE may be surrounded by a frame to stabilize the shape of the SPE, but because the frame and flow distribution plates thermally expand and contract individually, the external force applied by the fastener still changes. The change in the external force in this case produces stresses in the various members, and this may impair the durability of the various members of the assembly.

The packaging and/or the arrangement for ensuring such a controlled pressure and a required sealing performance tends to be large in size, and this has prevented a compact design for the fuel cell assembly. Furthermore, even with a highly elaborate arrangement for ensuring a sealing performance, due to the uneven thermal expansion and contraction of various parts, it has been difficult to maintain the required sealing performance for an extended period of time.

BRIEF SUMMARY OF THE INVENTION

In view of such problems of the prior art, a primary object of the present invention is to provide a fuel cell assembly which can ensure a favorable seal under all conditions.

A second object of the present invention is to provide a fuel cell assembly which can ensure a reliable electric contact between the electrode terminal and the gas diffusion electrode.

A third object of the present invention is to provide a fuel cell assembly which is highly compact and efficient at the same time.

A fourth object of the present invention is to provide a fuel cell assembly which is easy to manufacture.

According to the present invention, such objects can be accomplished by providing a fuel cell assembly with at least one cell each including an electrolyte layer, a pair of gas diffusion electrode layers interposing the electrolyte layer between them, and a pair of flow distribution plates for defining passages for fuel and oxidizer gases that contact the gas diffusion electrode layers, so that: the electrolyte layer comprises a frame and electrolyte retained in the frame; and each flow distribution plate and the corresponding frame are joined along a periphery thereof so as to achieve an air-tight cavity between them. Each flow distribution plate and the corresponding frame may be joined by anodic bonding, diffusion bonding, welding, brazing, and using a bonding agent.

This allows the flow distribution plates and frames to be joined with a required sealing capability without requiring any clamping arrangement, fasteners or any other arrangements relying on an external force.

In particular, if the flow distribution plates and frames are made of materials having similar thermal expansion properties, even when the assembly is subjected to changes in temperature, because the frame for the electrolyte layer and the flow distribution plates expand and contract in a similar manner, creation of any internal stress in the assembly can be avoided. This contributes to the conservation of the sealing performance of the assembly and enhancement of the durability of the assembly over an extended period of time and even when subjected to extreme conditions.

Preferably, the flow distribution plates and the frame for the electrolyte layer may be both made of a silicon wafer which is suited for micro working processes. According to a preferred embodiment of the present invention, the flow distribution plates and the frame for the electrolyte layer are joined along their periphery by using anodic bonding or a bonding agent. This eliminates the need for any gaskets or clamping arrangements, and simplifies the structure of the assembly while increasing the reliability of the assembly over an extended period of time and under extreme conditions.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
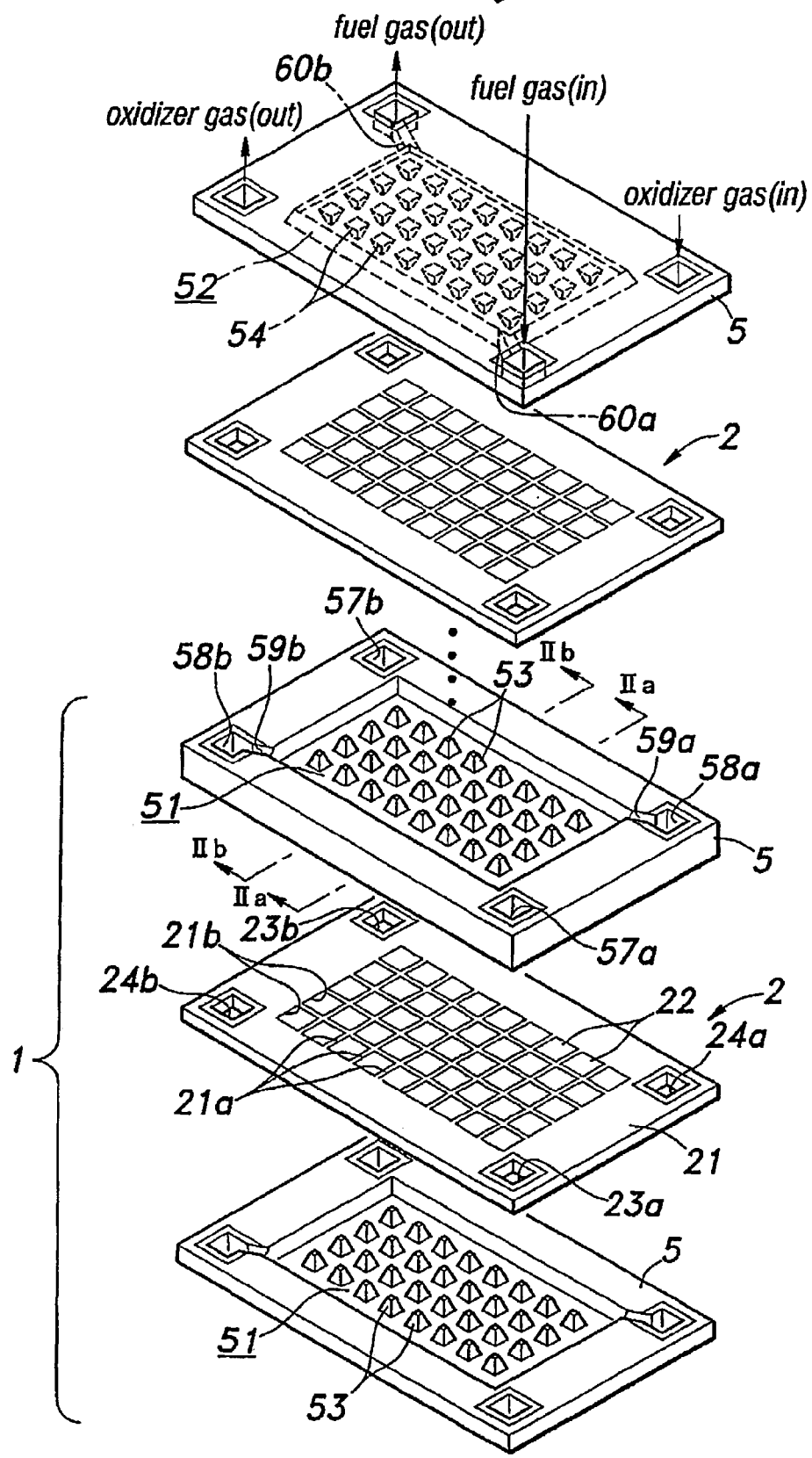
FIG. 1 is an exploded perspective view of a part of a fuel cell assembly embodying the present invention.

FIG. 1 shows the structure of a part of a fuel cell assembly embodying the present invention. In practice a plurality of cells are formed into a stack, and a number of such stacks are connected in series and/or parallel, and fuel such as reformed alcohol, hydrogen gas or the like is supplied to each fuel cell stack along with oxidizing gas such as air.

Figure 2A:
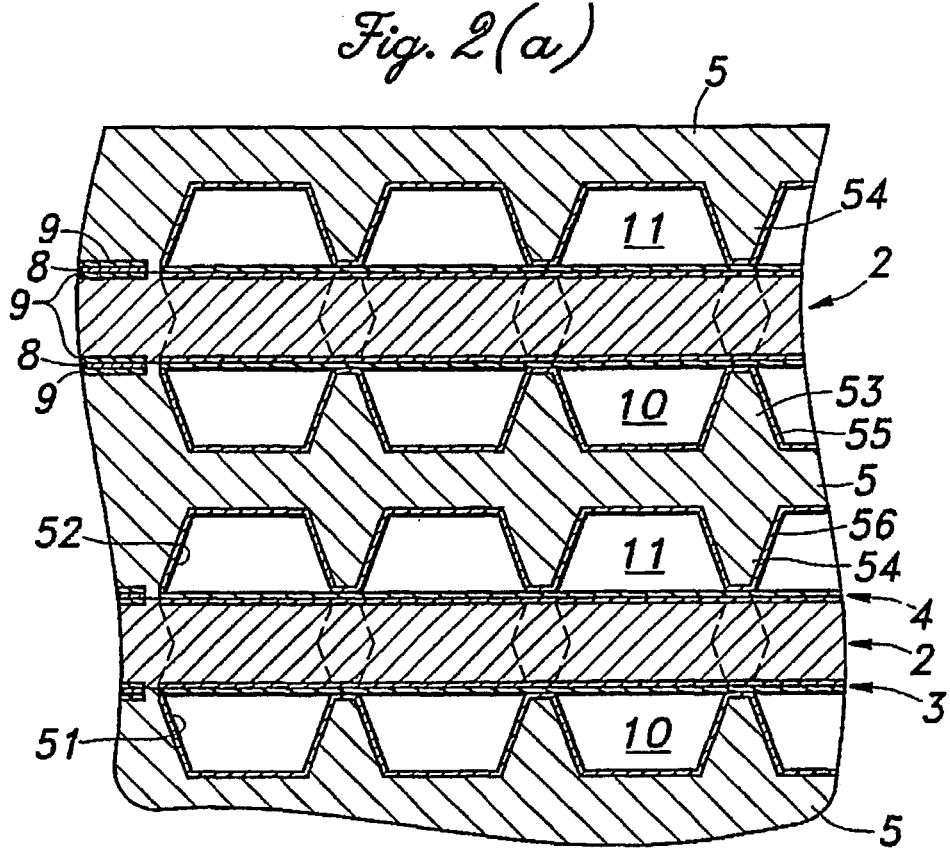
FIG. 2a is a sectional view taken along line IIa—IIa of FIG. 1.
Figure 2B:
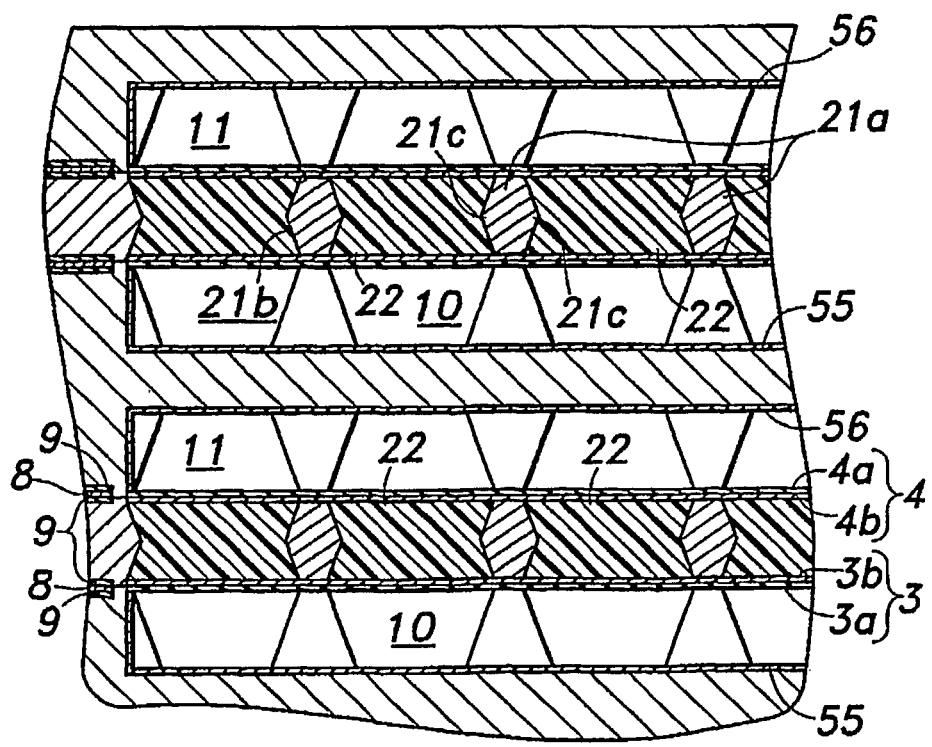
FIG. 2b is a sectional view taken along line IIb—IIb of FIG. 1.

Referring also to FIGS. 2a and 2b, each fuel cell 1 includes a central electrolyte layer 2, a pair of gas diffusion electrode layers 3 and 4 (see FIGS. 2a and 2b) placed on either side of the central electrolyte layer 2, and a pair of flow distribution plates 5 placed on either outer side of the gas diffusion electrode layers 3 and 4. The outer side of each flow distribution plate 5 is similarly formed as the inner side thereof so as to serve as the flow distribution plate for the adjacent fuel cell.

The electrolyte layer 2 comprises a grid frame 21, and solid polymer electrolyte (SPE) 22 which is filled into rectangular through holes 21b defined between adjacent bars 21a of the grid frame 21. The SPE 22 may be made from such materials as perfluorocarbonsulfonic acid (Nafion: tradename), phenolsulfonic acid, polyethylenesulfonic acid, polytrifluorosulfonic acid, and so on.

The grid frame 21 is formed by etching or otherwise working a silicon wafer, and is provided with a rectangular and annular fringe portion and a rectangular grid area defined inside the annular fringe portion. Each bar 21a in the grid area of the grid frame 21 is provided with a projection 21c at an intermediate part thereof so as to project into an intermediate part of the corresponding through hole 21b as best shown in FIGS. 2a and 2b. The projection 21c is in the shape of a ridge extending along the length of the bar 21a, and produces a narrower middle part in each through hole 21b. The projection 21c helps to retain the SPE 22 in each through hole 21b.

Figure 3A:
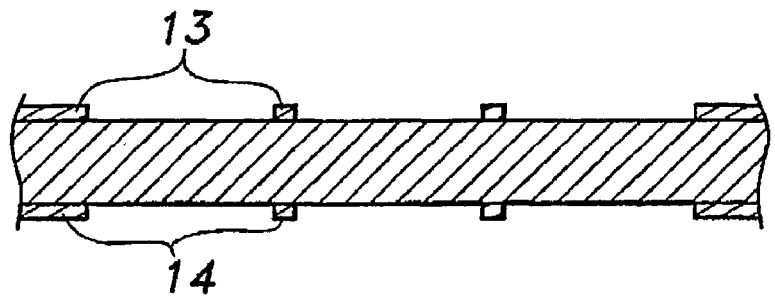
FIGS. 3a to 3c are sectional views of the electrolyte layer in different steps of the fabrication process.
Figure 3B:
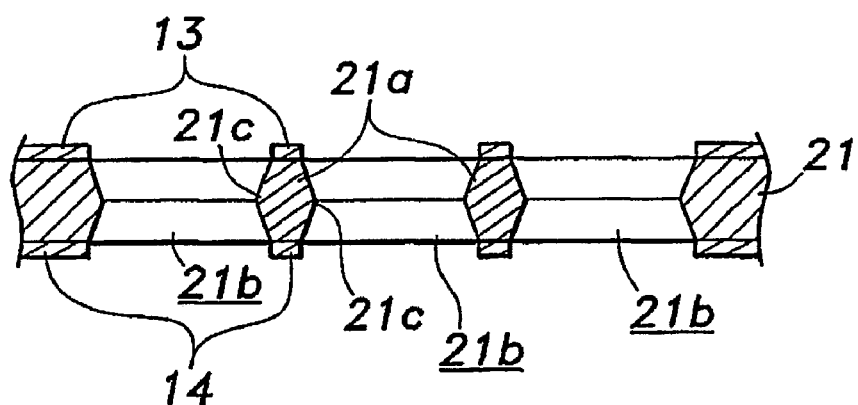
Figure 3C:
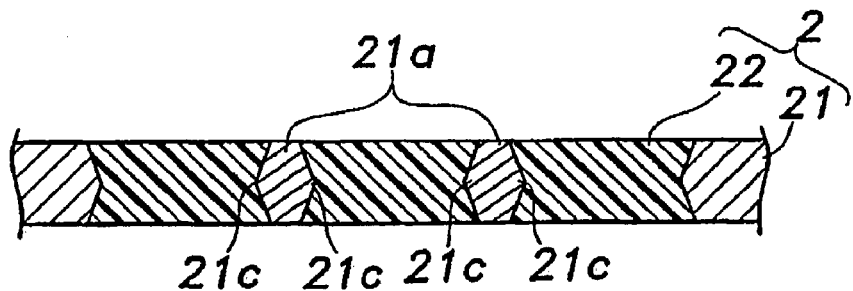

Such a projection can be conveniently formed at the same time as forming the grid frame 21. FIGS. 3a to 3c illustrate the process of forming the electrolyte layer 2. First of all, a suitably patterned photoresist layer 13 and 14 is placed on each side of a silicon wafer serving as the material for the grid frame 21 as shown in FIG. 3a. An anisotropic etching is performed from both sides of the wafer as illustrated in FIG. 3b, and this produces a plurality of through holes 21b each of which is narrowed in a middle part by a projection 21c. Then, SPE 22 is filled into each of the through holes 21b so as to define a substantially flush planar surface on each side of the electrolyte layer 2.

In this embodiment, a rectangular through hole 23a, 23b, 24a and 24b is formed in each corner portion of the fringe portion of the grid frame 21. One of the diagonally opposing pairs of these through holes 23a and 23b serve as inlet and outlet for the fuel gas. The remaining opposing pair of these through holes 24a and 24b serve as inlet and outlet for the oxidizing gas.

Each flow distribution plate 5 is also formed by working a silicon wafer, and has a substantially conformal rectangular shape. A rectangular recess 51 or 52 having a flat bottom is formed centrally on each side of the flow distribution plate 5, and a plurality of projections 53 or 54 each having the shape of a truncated pyramid are formed on the flat bottom. The surface of the recesses and the projections are coated with a gold plate layer serving as an electrode terminal layer 55 or 56 by suitable means for electrically connecting the gas diffusion electrode layers 3 and 4 to an external circuit.

Figure 4A:
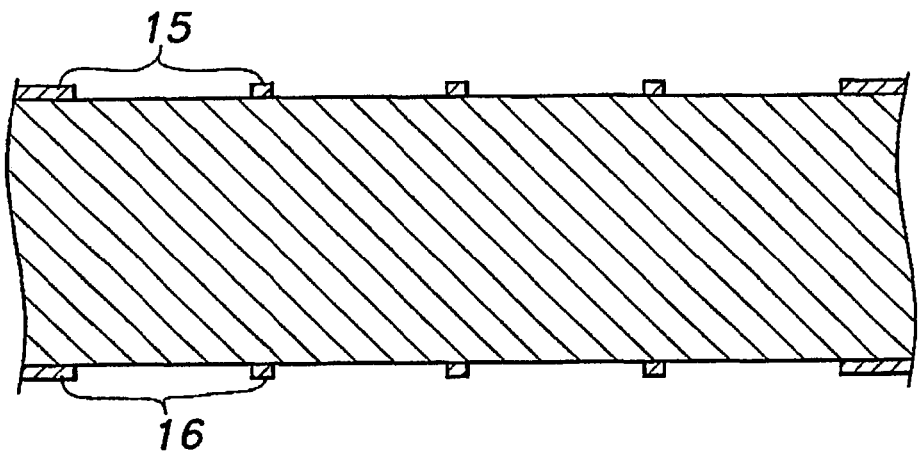
FIGS. 4a to 4c are sectional views of the flow distribution plate in different steps of the fabrication process.
Figure 4B:
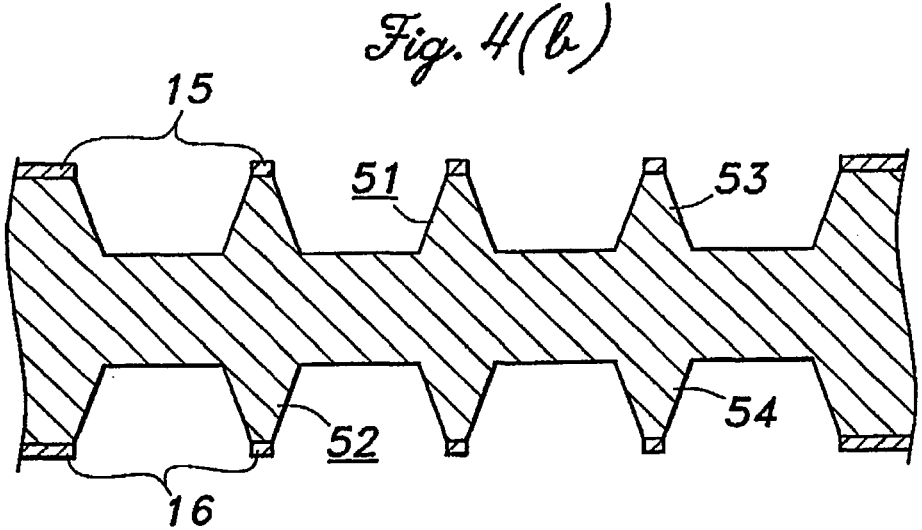
Figure 4C:
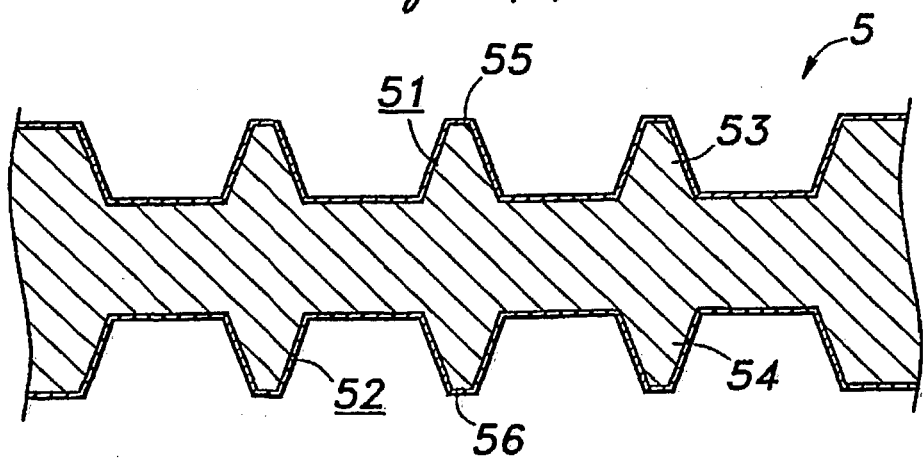

FIGS. 4a to 4c show the process of forming each flow distribution plate 5. A suitably patterned photoresist layer 15 and 16 is formed on each side of a silicon wafer as shown in FIG. 4a, and the silicon wafer is etched from both sides to form the recesses 51 and 52 and projections 53 and 54 at the same time as shown in FIG. 4b. The distribution plate 5 on the upper end or lower end of each fuel cell stack may be provided with a recess and projections only on inner side thereof. Thereafter, electrode terminal layer 55 and 56 is formed over the surface of the recesses 51 and 52 and projections 53 and 54 as shown in FIG. 4c.

The distribution plate 5 is conformal to the grid frame 21, and therefore has a rectangular shape. A rectangular through hole 57a, 57b, 58a or 58b is formed in each corner portion of the fringe portion thereof. One of the diagonally opposing pairs of these through holes 57a and 57b serve as inlet and outlet for the fuel gas. The remaining opposing pair of these through holes 58a and 58b serve as inlet and outlet for the oxidizing gas. As shown in FIG. 1, grooves 59a and 59b formed in the fringe portion communicate the recess 51 with the through holes 58a and 58b for the oxidizing gas, and similar grooves 60a and 60b communicate the recess 52 with the through holes 57a and 57b for the fuel gas.

The gas diffusion electrode layers 3 and 4 each include a carbon sheet 3a or 4a having a layer of a platinum catalyst 3b and 4b mixed with SPE formed on the side thereof facing the electrolyte layer 2.

In this manner, in each fuel cell, a pair of flow distribution plates 5 are placed on either side of an electrolyte layer 2 via a gas diffusion electrode layer 3 or 4, and these components are joined by anodic bonding along the parts surrounding the recesses. Therefore, a plurality of narrow passages 11 are defined in one of the central recesses 52 of each electrolyte layer 2 for the fuel gas, and a plurality of similar narrow passages 10 are defined in the other of the central recesses 51 of the electrolyte layer 2 for the oxidizing gas. Each projection is substantially entirely covered by a gold plate layer serving as an electrode terminal, and lightly pushes the gas diffusion electrode layer 3 or 4 against the frame grid 21 of the electrolyte layer 2. Therefore, each gas diffusion electrode layer 3 or 4 is electrically connected to the corresponding distribution plate 5 via a large number of projections in a parallel relationship, and a reliable electric connection between the electrolyte layer 2 and an external circuit can be established.

The adhesion between the grid frame 21 and the distribution plates 5 can be accomplished in a number of different ways. Preferably, anodic bonding is used as described in the following. An electrode layer 9 and a layer 8 of heat resistance and hard glass, for instance, made of Pyrex glass (tradename) are formed along the peripheral surface of the grid frame 21 of the electrolyte layer 2 on each side thereof by sputtering, and a similar electrode layer 9 is formed along the peripheral part of the opposing surface of the distribution plates 5. Then, with this assembly heated to about 400° C. at which sodium ions become highly mobile, an electric field is produced in the assembly so as to move ions. In the fuel cell assembly of the present invention, if the electrolyte includes a solid polymer, heating the entire assembly to the temperature of 400° C. may damage the solid electrolyte. Therefore, according to this embodiment, a heater (not shown) is placed under the electrode layer 9 to selectively heat only the peripheral part of the flow distribution plates. The heater may include polycrystalline silicon sandwiched between insulating layers such as $Si_3N_4$ layers. If the electrode terminal layer 55 and 56 extend under the heater, the thermal efficiency of the heater will be impaired. Therefore, it is preferable to omit the electrode terminal layer 55 and 56 from under the heater.

The grid frame 21 and the distribution plates 5 are placed one over another, and compressed at a pressure of 100 $gf/cm^2$ to 2,000 $gf/cm^2$. Electric current is conducted through the polycrystalline silicon heater to locally heat the bonded area to a temperature in the other of 400° C. At the same time, a voltage in the order of 100 to 500 V is applied between the electrode layer 9 of the grid frame 21 and the electrode layer 9 of the distribution plate 5 for 10 to 30 minutes.

Alternatively, a bonding agent may be used for attaching the grid frame 21 and the distribution plates 5 together. In either case, it is possible to eliminate the need for any sealing arrangements or clamping arrangements to achieve a desired sealing capability, and this allows a compact design of the fuel cell assembly.

As the fuel gas and oxidizing gas (air) are conducted through this fuel cell 1, an electrochemical reaction takes places by virtue of the platinum catalyst, and an electric voltage develops between the electrode terminal layers 55 and 56. A number of such fuel cells are stacked so that a desired voltage can be obtained.

Although the fuel and oxidant for the fuel cells described herein consists of gases, they may also include liquids.

Although the present invention has been described in terms of preferred embodiments thereof, it is obvious to a person skilled in the art that various alterations and modifications are possible without departing from the scope of the present invention which is set forth in the appended claims.

The invention claimed is:

1. A fuel cell assembly comprising at least one cell comprising an electrolyte layer (2), a pair of gas diffusion electrode layers (3, 4) interposing the electrolyte layer between them, and a pair of flow distribution plates (5) for defining passages (10, 11) for fuel and oxidizer gases that contact the gas diffusion electrode layers, characterized by that: the electrolyte layer (2) comprises a frame (21) and electrolyte (22) retained in the frame; the flow distribution plates and the frame are made of materials having similar thermal expansion properties; and wherein each flow distribution plate and the corresponding frame are joined along a periphery thereof so as to achieve an air-tight cavity between them.

2. A fuel cell assembly according to claim 1, wherein each flow distribution plate and the corresponding frame are joined by anodic bonding along a periphery thereof so as to achieve an air-tight cavity between them.

3. A fuel cell assembly according to claim 1, wherein each flow distribution plate and the corresponding frame are joined by a bonding agent along a periphery thereof so as to achieve an air-tight cavity between them.

4. A fuel cell assembly comprising at least one cell comprising an electrolyte layer (2), a pair of gas diffusion electrode layers (3, 4) interposing the electrolyte layer between them, and a pair of flow distribution plates (5) for defining passages (10, 11) for fuel and oxidizer gases that contact the gas diffusion electrode layers, characterized by that: the electrolyte layer (2) comprises a frame (21) and electrolyte (22) retained in the frame; and wherein the flow distribution plates and the frame are made of silicon substrates having similar thermal expansion properties.

* * * * *